(12) United States Patent
Fabec

(10) Patent No.: US 11,320,089 B2
(45) Date of Patent: May 3, 2022

(54) EXPANDABLE MAGNETIC HOLDER AND METHODS OF MANUFACTURE AND USE

(71) Applicant: Louis Francis Fabec, Suwanee, GA (US)

(72) Inventor: Louis Francis Fabec, Suwanee, GA (US)

( * ) Notice: Subject to any disclaimer, the term of this patent is extended or adjusted under 35 U.S.C. 154(b) by 0 days.

(21) Appl. No.: 16/726,822

(22) Filed: Dec. 24, 2019

(65) Prior Publication Data

US 2020/0217450 A1 Jul. 9, 2020

(30) Foreign Application Priority Data

Dec. 24, 2018 (CN) .......................... 201822176950.6

(51) Int. Cl.
*F16M 11/00* (2006.01)
*F16M 13/02* (2006.01)
(Continued)

(52) U.S. Cl.
CPC ............. *F16M 13/022* (2013.01); *F16B 1/00* (2013.01); *F16M 11/126* (2013.01); *F16M 11/40* (2013.01); *F16B 2001/0035* (2013.01)

(58) Field of Classification Search
CPC ........... F16B 1/00; F16M 11/40; F16M 11/26; F16M 13/022; F16M 11/041; F16M 11/06; F16M 11/2021; H04M 1/04
See application file for complete search history.

(56) References Cited

U.S. PATENT DOCUMENTS 2,094,268 A 9/1937 Friedman
2,876,979 A 3/1959 Barbera
(Continued)

FOREIGN PATENT DOCUMENTS

CN 207939576 U 3/2018
CN 207588957 U 6/2018
GB 2 316 263 10/2000

OTHER PUBLICATIONS

Otterbox, Otter+Pop Symmetry Series, www.otterbox.com/en-US/otter-pop, Access Date: Dec. 19, 2019, Publication Date of Similar Content: May 27, 2019 (according to Wayback Machine), pp. 1-5, World Wide Web.
(Continued)

*Primary Examiner* — Amy J. Sterling
(74) *Attorney, Agent, or Firm* — Silver Legal LLC; Jarrett L. Silver

(57) ABSTRACT

Disclosed herein are an air bag type magnet holder, a method of manufacturing and a method of use. The air bag type magnet holder comprises a magnet outer base, an inner base for being attached or attracted to the back of a mobile phone, and an expandable air bag with an expanding and contracting function arranged between the magnet outer base and the inner base, and the magnet outer base comprises a lower shell connected to a second end of the expandable air bag, a metal plate fixed to the bottom shell and facing one side of the expandable air bag, and a plurality of magnet inserts embedded in the lower shell and attached to the metal plate. The attractive force of the magnet inserts is utilized to attract the magnet holder onto an external metal-containing article creating a new level of mobility for the user over other phone grips on the market.

28 Claims, 11 Drawing Sheets

(51) Int. Cl.
*F16M 11/40* (2006.01)
*F16B 1/00* (2006.01)
*F16M 11/12* (2006.01)

(56) References Cited

U.S. PATENT DOCUMENTS

| | | | |
|---|---|---|---|
| 2,880,902 | A | 4/1959 | Owsen |
| 4,403,709 | A | 9/1983 | Meins et al. |
| 4,846,510 | A | 7/1989 | Mikol |
| 4,927,191 | A | 5/1990 | Mikol |
| 4,955,493 | A | 9/1990 | Touzani |
| 5,568,549 | A | 10/1996 | Wang |
| 6,888,940 | B1 | 5/2005 | Deppen |
| 7,374,142 | B2 * | 5/2008 | Carnevali ............ F16M 13/00 224/183 |
| 7,822,448 | B2 * | 10/2010 | Lin ..................... H04M 1/18 455/575.8 |
| 8,560,031 | B2 | 10/2013 | Barnett et al. |
| D777,022 | S | 1/2017 | Barnett |
| 9,800,283 | B2 * | 10/2017 | Schmidt ............... F16M 13/00 |
| D815,067 | S | 4/2018 | Kim |
| D818,808 | S | 5/2018 | Barnett |
| 9,958,107 | B1 | 5/2018 | Hobbs et al. |
| 9,970,589 | B2 | 5/2018 | Hobbs et al. |
| 10,030,807 | B1 | 7/2018 | Hobbs et al. |
| 10,060,573 | B2 * | 8/2018 | Hobbs ..................... H04M 1/04 |
| 10,463,116 | B2 * | 11/2019 | Barnett .................... A45F 5/00 |
| 10,897,984 | B2 * | 1/2021 | Roth ....................... A45F 5/00 |
| 2011/0260020 | A1 * | 10/2011 | Isserow ................... G09F 3/10 248/205.3 |
| 2012/0292463 | A1 * | 11/2012 | Burns ................. F16M 11/041 248/125.8 |
| 2014/0317329 | A1 | 10/2014 | Barnett et al. |
| 2014/0374554 | A1 * | 12/2014 | Jordan .................... A47G 1/17 248/206.5 |

OTHER PUBLICATIONS spinpops.com, Access Date: Dec. 19, 2019, Publication Date of Similar Content: Aug. 5, 2019, (according to Wayback Machine), pp. 1-4, World Wide Web.

Wholesale Mobile phone Socket Grip—Free Shipping, www.ninjapopgrip.com/products/phone-grip-stand-cheap, Access Date: Dec. 19, 2019 (Publication Date Not Archived on Wayback Machine), highlighted image found at cdn.shopify.com/s/files/1/1919/4553/products/Custom_phone_grip_socket_stand_1_1800x1800.jpg?v=1550806912, pp. 1-8 (and image), World Wide Web.

Nuckees Phone Grip and Stand, www.4imprint.com/product/150179, Access Date: Dec. 19, 2019 (Publication Date Not Archived on Wayback Machine), pp. 1-2, World Wide Web.

* cited by examiner

EXPANDABLE MAGNETIC HOLDER AND METHODS OF MANUFACTURE AND USE

CROSS-REFERENCE TO RELATED APPLICATION

This application claims the benefit of and priority to Chinese Patent Application No. 201822176950.6 filed Dec. 24, 2018, the contents of which being incorporated in their entirety herein.

BACKGROUND

Technical Field

The embodiments disclosed herein relate to the field of mobile device holders, and more specifically, to an air bag type magnet holder, a method of manufacturing and a method of use.

Description of Related Art

With the development of mobile intelligent devices such as mobile phones, tablet computers, etc., the development of mobile phone holders as auxiliary tools for assisting mobile intelligent devices is also becoming faster and faster with more and more varieties and functions.

Chinese patent number CN207939576U discloses an air bag type rotatable mobile phone holder, which comprises a base, an air bag holder, a gyroscope body, and a top central shaft cover, where the air bag holder (11) is an expandable air bag holder. CN207939576U discloses a mobile phone holder which utilizes the expanding and contracting function of an air bag to reduce occupied space and volume for convenient carrying and use.

Chinese patent number CN207588957U discloses a telescoping type mobile phone holder including a "magnetic" metal sheet that is capable of conducting magnetism (which Applicant interprets as a non-magnet metal piece) on the phone side of the device. To operate this magnetically, a magnet would have to be introduced outside of the device.

SUMMARY

The devices and methods described herein each have several aspects, no single one of which is solely responsible for its desirable attributes. Without limiting the scope of this invention as expressed by the claims which follow, some features are described briefly below. After considering this description, and particularly after reading the section entitled "Detailed Description," one will understand the advantageous features of the systems, methods, and devices described herein.

Applicant's exemplary devices benefit from the attractive force of a magnet or magnet inserts to attract the magnet holder onto an external metal-containing article. When the magnet holder does not need to be used or needs to be moved to other places, the magnet holder can be moved by just pulling up the magnet holder with upward force from the external metal-containing article. In this way, the magnet holder can be used at multiple places, so the magnet holder is highly practical.

Usage of the mobile phone holders in both Chinese patents above are fixed by utilizing double-sided adhesive tapes and/or the fixed positioning of an external magnet that is assumed fixed by an adhesive. Disclosed herein is an air bag type magnet holder that has its own magnet having a compact magnet outer base profile and strong magnetic force. Exemplary devices can be easily moved to different surfaces. Also discussed herein is a method of manufacturing and a method of using the exemplary devices.

In some exemplary embodiments, an air bag type magnet holder includes an inner base that is attachable to a mobile device; an outer magnet base having a magnet configured for magnetically attaching the magnet holder, including a mobile device that can be attached to the inner base, to an external surface containing metal that is distinct from the magnet holder; and an expandable air bag including a first end connected to the inner base and a second end connected to the outer magnet base and configured to have at least an expanded position extending the expandable air bag along a first axis providing clearance for a user's fingers between the inner base and the outer magnet base and a contracted position holding the outer magnet base proximate to the inner base.

Additionally or alternatively, the outer magnet base comprises an inner shell connected to the second end of the expandable air bag, an outer shell on an opposite end of the outer magnet base from the inner shell, a metal plate at a transverse angle to the first axis and proximate to the inner shell, and the magnet opposite the metal plate embedded in the lower shell and disposed adjacent to the metal plate. Additionally or alternatively, the expandable air bag is of an inverted conical structure in the expanded position, a circumferential wall of the second end of the expandable air bag is provided with an annular fastening groove, the inner shell is provided with a round hole, and the fastening groove is fastened inside the inner shell through the round hole.

In some embodiments, the edges of both the inner base and the magnet outer base are shaped like circular arcs and defining a space for a user's finger tips to separate the inner base and the magnet outer base of the expandable air bag in the contracted position. Additionally or alternatively, the first end of the expandable air bag can be provided with an annular fastening ring, the inner base comprises a collar hooping the outside of the fastening ring, and an inner cover nested inside the collar and used for fixing the fastening ring to the collar. Additionally or alternatively, an interior wall of the collar is provided with a plurality of L-shaped limit slots, the interior ends of the limit slots communicate with the interior surface of the collar, a plurality of fastening projections aligned with the limit slots are formed on an exterior circumferential wall of the top cover, the fastening ring is provided with a plurality of fastening holes which are aligned with the plurality of fastening projections, and after passing through the fastening holes, the fastening projections are fixed in the limit slots.

In some embodiments, the expandable air bag is provided with air holes to release air inside the expandable air bag when the expandable air bag contracts from the expanded position to the contracted position.

In some embodiments, a double-sided adhesive tape or a second magnet is arranged on the inner base on a side of the inner base opposite the first end of the air bag.

In some embodiments, an attaching layer is arranged on an opposite side of the magnet out base from the air bag, the lower shell is provided with a through hole along a vertical direction, and the magnet insert is arranged in the through hole, with the lower shell attached to the attaching layer.

Optionally, the expandable air bag has a pivot position wherein the expandable air bag holds the inner base and the outer magnet base at a position along a different axis than the first axis.

Additionally, the magnet can be a plurality of magnet inserts, and some could be disc-shaped and arranged in a plane with alternating polarities radially around the outer magnet base.

Optionally, the metal plate is disposed inside a circumferential lip extending from the interior of the outer magnet base that supports an exterior portion of each of the plurality of magnet inserts that is unsupported by the magnet plate.

Applicant's devices can optionally be part of a kit containing the air bag type magnet holder of claim 1, an adhesive on the inner base, and a metal disc including an adhesive on one side.

Also disclosed herein is a method of manufacturing the air bag type magnet holder. The exemplary methods can include the following steps: (1) a step of manufacturing an outer magnet base including molding an attaching layer and a lower shell, arranging a plurality of magnet inserts with alternating polarities radially in a plane adjacent to a metal plate, inserting the metal plate and the plurality of magnet inserts inside of the lower shell and the attaching layer; (2) a step of creating an inner base comprising a collar hooping the outside of an annular fastening ring of an expandable air bag, wherein placing the collar over a second end of the expandable air bag and moving it along the expandable air bag until it seats onto an annular fastening ring on a first end of the expandable air bag, circumferentially surrounding the outside of the annular fastening ring with the collar, and fixing the fastening ring to the collar by nesting an inner cover inside the collar; and (3) a step of attaching the expandable air bag to the magnet outer base including inserting the second end of the expandable air bag into a round hole in the lower shell so that an annular fastening groove on the expandable air bag locks into the round hole of the lower shell.

Optionally, the step of creating an inner base further includes molding into an interior wall of the collar is provided with a plurality of L-shaped limit slots that are aligned with a plurality of fastening projections molded on an exterior circumferential wall of the top cover and a plurality of fastening holes formed in the fastening ring, and affixing the plurality of fastening projections through the plurality of fastening holes and into the limit slots.

Additionally, the step of molding a magnet outer base can involve creating carveouts into which the magnet inserts fit into, and the step of arranging further comprises inserting the magnet inserts into the carveouts.

Applicant also describes a method of using an air bag type magnet holder. The method can include the steps of (1) attaching the inner base of the air bag type magnet holder to the mobile device; and (2) positioning the outer magnet base to the external surface containing metal to cause the air bag type magnet holder to magnetically adhere to the surface.

Other optional variations include the step of adhering uses an adhesive, the mobile device being a phone and/or the external surface being part of a refrigerator, toolbox, dishwasher, or motor vehicle.

A first example embodiment is an air bag type magnet holder comprises a magnet outer base, an inner base for being attached or attracted to the back of a mobile phone, and an expandable air bag with an expanding and contracting function arranged between the magnet outer base and the inner base, and the magnet outer base comprises a bottom shell connected to the bottom of the expandable air bag, a metal plate fixed to the bottom shell and facing one side of the expandable air bag, and a plurality of magnet inserts embedded in the bottom shell and attached to the metal plate.

The expandable air bag can have an inverted conical structure, a circumferential wall of the bottom of the expandable air bag is provided with an annular fastening groove, the bottom shell is provided with a round hole, and the fastening groove is fastened to the bottom shell via the round hole.

Preferably, the edges of both the bottom shell and the inner base are shaped like circular arcs.

In some embodiments, the device has first end of the expandable air bag is provided with an annular fastening ring. The inner base comprises a collar surrounding the outside of the fastening ring of the expandable air bag, and a top cover nested inside the collar and used for fixing the fastening ring on the collar.

In some embodiments, the inner wall of the collar is provided with a plurality of L-shaped limit slots, the top ends of the limit slots communicate with the inner surface of the collar, a plurality of fastening projections which are aligned with the limit slots are formed on the circumferential wall of the top cover, the fastening ring is provided with a plurality of fastening holes which are aligned with the fastening projections, and after passing through the fastening holes, the fastening projections are fixed in the limit slots.

Preferably, a double-sided adhesive tape or a magnet is arranged on the inner base.

Preferably, the air bag type magnet holder is characterized in that an attaching layer is arranged on the bottom of the bottom shell, the bottom shell is provided with through holes along a vertical direction, and the magnet inserts are arranged in the through holes, with the lower portions attached to the attaching layer.

Details of one or more embodiments of the subject matter described in this application are set forth in the accompanying drawings and the description below. Any of the features, components, or details of any of the arrangements or embodiments disclosed in this application are combinable and modifiable to form myriad new arrangements and embodiments that fall within the spirit and scope of this disclosure. Other features, aspects, and advantages will also become apparent from the description, the drawings, and the claims. Note that the relative dimensions of the following figures may not be drawn to scale.

BRIEF DESCRIPTION OF THE DRAWINGS

Embodiments will now be described with reference to the following drawings, which are provided by way of example, and not by way of limitation. Like reference numerals indicate identical or functionally similar elements, and unmarked elements do not indicate the absence of such element.

FIGS. 2-5 are perspective exploded diagram of how the components fit together.

FIG. 1 is a schematic cross-sectional structure diagram bisecting the example device.

FIG. 2 is a perspective view of an expandable air bag containing an annular ring on one end and an annular fastening groove on the other end.

FIG. 3 is a perspective view of a collar that fits around the annual ring of FIG. 2.

FIG. 4 is a perspective view of a top cover having a plurality of fastening projection.

FIG. 5 is a perspective view of a molded piece of the magnet outer base into which magnet inserts can be inserted.

DETAILED DESCRIPTION

Figure 1:
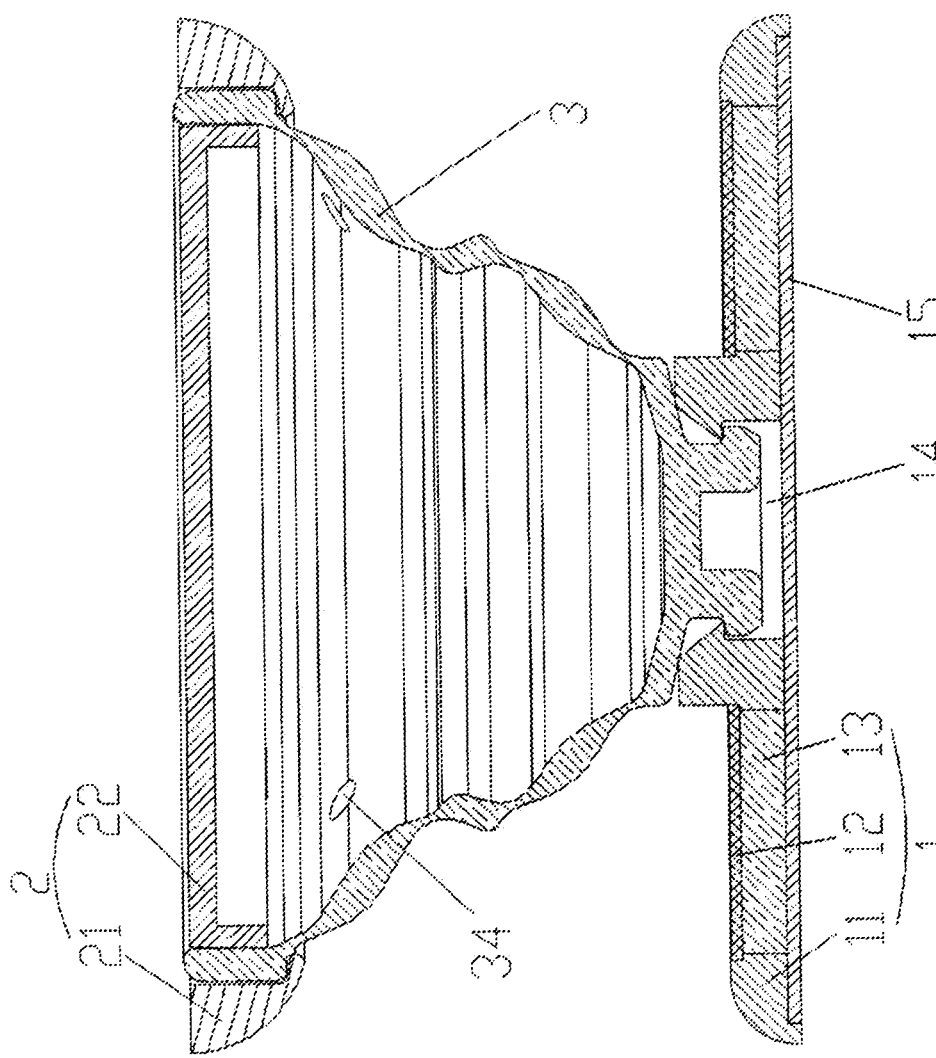
FIGS. 1-5 are of a first example embodiment.
Figure 2:
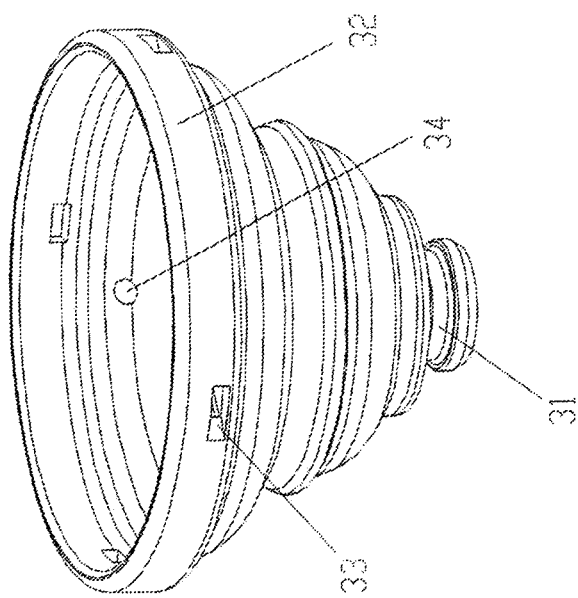
Figure 3:
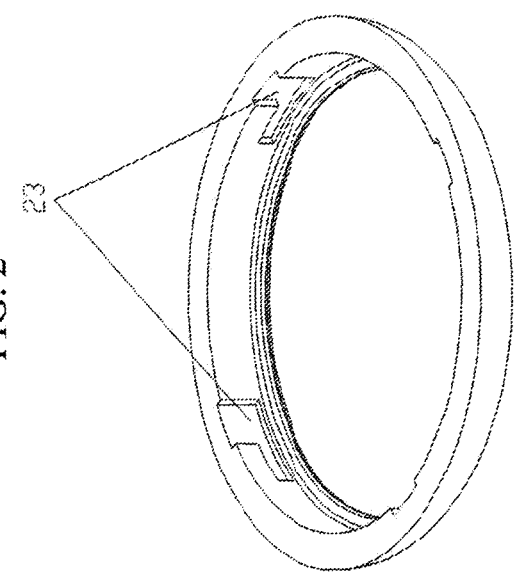
Figure 4:
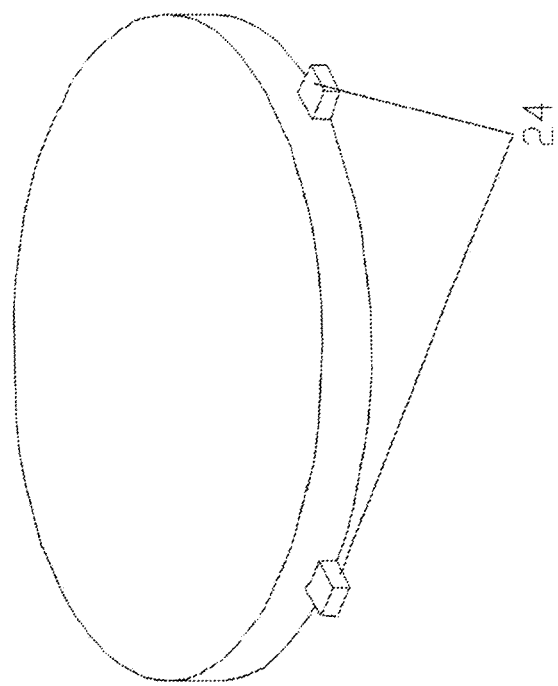
Figure 5:
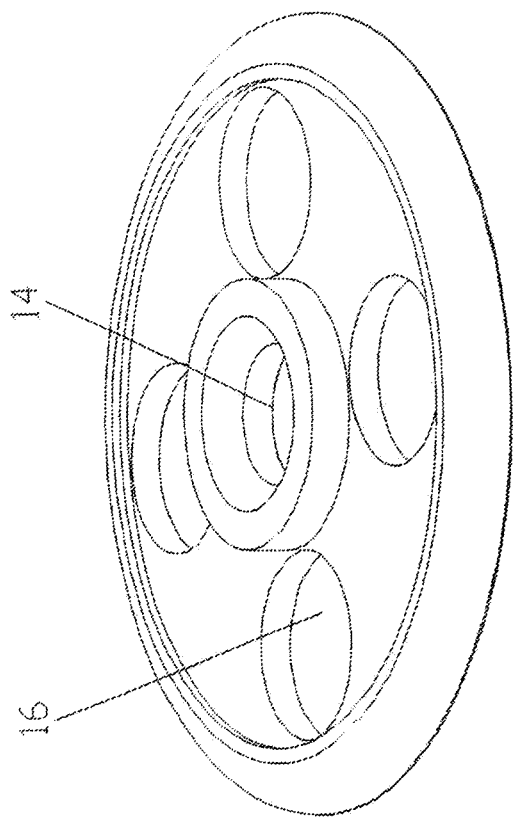
Figure 6:
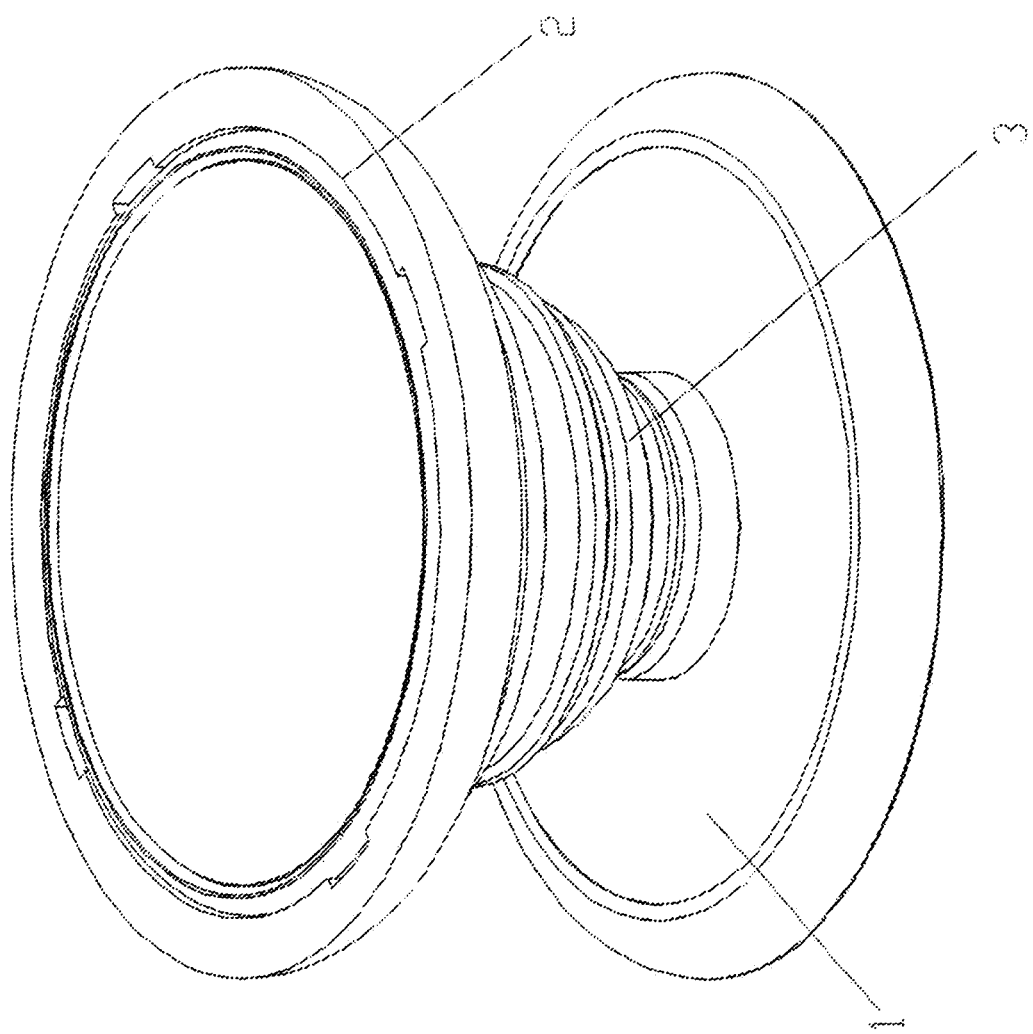
FIG. 6 is a perspective view of the assembled device of FIGS. 2-5.

Embodiment disclosed herein generally relate to mobile device holders. Various embodiments will be described in detail below by reference to the drawings. However, the embodiments may be implemented in a variety of different ways defined and covered by the claims and amendments thereto.

Unless the context dictates otherwise, "inner" would be towards and "outer" would be away from the mobile phone or other mobile device or item side of the magnet holder. For example, the "inner" base can be mounted on a phone and the "outer" magnet base can be mounted on a refrigerator.

As shown in FIGS. 1-6, the first exemplary embodiment illustrates an air bag type magnet holder, which comprises an magnet outer base 1, an inner base 2 for being attached or attracted to the back of a mobile phone, and an expandable air bag 3 with an expanding and contracting function arranged between the magnet outer base 1 and the inner base 2. The magnet outer base 1 comprises a bottom shell 11 connected to the bottom of the expandable air bag 3, an metal plate 12 fixed to the bottom shell and facing one side of the expandable air bag 3, and a plurality of magnet inserts 13 embedded in the bottom shell and attached to the metal plate.

Based on the aforementioned structure, the attractive force of the magnet inserts 13 is utilized to affix the magnet holder onto a metal-containing article in a place such as a kitchen, a gymnasium, an automobile; when the magnet holder does not need to be used or needs to be moved to other places, the magnet holder can be moved by just pulling up the magnet holder with strength; the magnet holder can be used at multiple places; moreover, by utilizing the combination of the metal plate 12 and the magnet insert 13, the metal plate 12 is also magnet; by utilizing the combination of the plurality of magnet inserts 13 and the metal plate 12, the magnet force of the metal plate 12 is enhanced, and therefore fixing is steadier; the magnet force of the metal plate is utilized to fasten the bottom shell between an external article and the metal plate, thus fixing the magnet holder; and due to the arrangement of the expandable air bag 3, the magnet holder can be conveniently contracted to reduce occupied space when the magnet holder is not used.

In order to facilitate the holding of the mobile phone holder, the expandable air bag 3 of the present embodiment is of an inverted conical structure, the circumferential wall of the bottom of the expandable air bag 3 is provided with an annular fastening groove 31, the bottom shell 11 is provided with a round hole 14, and the fastening groove 31 is fastened to the bottom shell 11 via the round hole 14. (The fastening groove 31 can be rotated in the round hole 14, so that the angle of the mobile phone can be conveniently adjusted when the mobile phone is clamped). As the combination of the size of the bottom of the fastening groove 31 and the magnet outer base 1 is utilized, fingers can be utilized to hold the portion between the bottom of the air bag 3 and the magnet outer base 1, consequently, the magnet holder is held by the fingers, and when the magnet holder and the mobile phone are combined, the mobile phone can be conveniently fixed and moved; and by the combination of the fastening groove 31 and the round hole 14, the connection between the expandable air bag 3 and the magnet outer base is realized.

Figure 7:
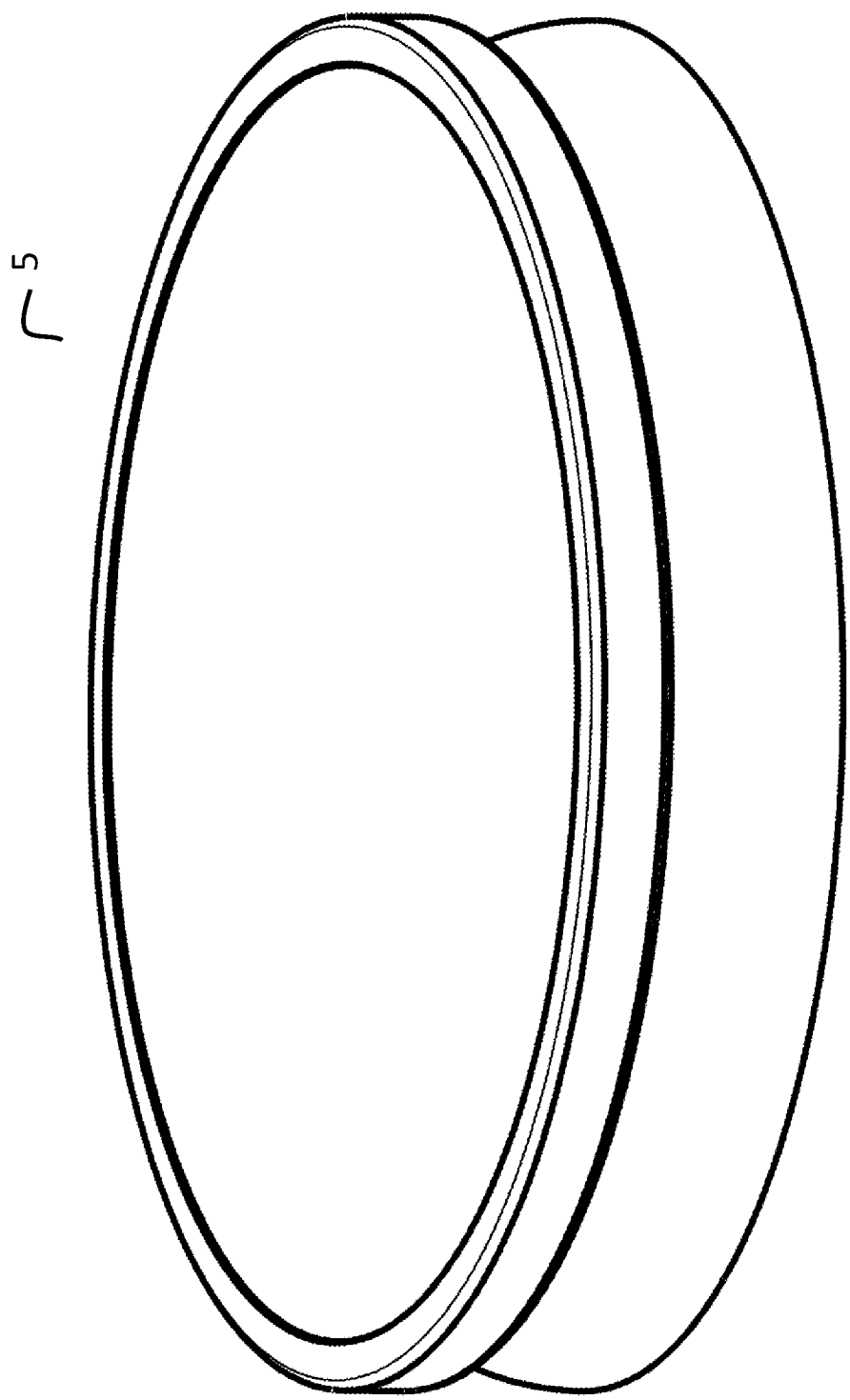
FIG. 7 is a perspective view of an exemplary device with its airbag in a contracted position.

FIG. 7 illustrates a closed magnet holder. In order to have a good experience when holding the magnet holder by the fingers, the exterior edges of both the lower shell 11 and inner base 2 of the present embodiment are shaped like circular arcs to define a gap where a user's fingers can grip and expand the magnet holder. By utilizing the circular arc-shaped structures of the bottom shell 11 and the inner base 2, the fingers can be prevented from being scratched when holding the magnet holder, so that the safety of the user is guaranteed, and practicability and experience are enhanced.

In order to affix the expandable air bag 3 onto the inner base 2, the upper portion of the expandable air bag 3 of the exemplary embodiment is provided with an annular fastening ring 32, the inner base 2 comprises a collar 21 hooping the outside of the fastening ring 32 and a top cover 22 nested inside the collar 32 and used for fixing the fastening ring 32 to the collar 21. A friction fit between the top cover 22 and the collar 21 can be utilized to fix the fastening ring 32, thus affixing the expandable air bag 3 and the inner base together.

In order to conveniently fix the expandable air bag 3 and the inner base 2, preferably, the inner wall of the collar 21 of the present embodiment is provided with a plurality of L-shaped limit slots 23, the top ends of the limit slots 23 communicate with the inner surface of the collar 21, a plurality of fastening projections 24 which are aligned with the limit slots 23 are formed on the circumferential wall of the top cover 22, the fastening ring 32 is provided with a plurality of fastening holes 33 which are aligned with the fastening projections 24, and after passing through the fastening holes 33, the fastening projections 24 are fixed in the limit slots 23. Thus, after the fastening projections 24 pass through the fastening holes 33, the fastening projections 24 are pressed into the limit slots 23 from the inner ends of the limit slots 23, and then, by rotating the top cover 22, the expandable air bag 3 and the inner base 2 can be affixed.

In order to ensure the expanding and contraction of the expandable air bag 3, the expandable air bag 3 of the present embodiment is provided with air holes 34. The arrangement of the air holes 34 ensures that air can get into and out of the expandable air bag 3 in the process of contraction and expanding. Applicant's exemplary devices can have various numbers of airholes, e.g., 6 airholes, depending on the applications, material thicknesses, structural rigidity and response times needed.

While many fastening methods are disclosed herein, one of ordinary skill in the art would appreciate that other methods of fastening may replace the methods of fastening herein and still achieve Applicant's intended purpose. Therefore, such disclose fastening methods should not be construed as limited.

Figure 8:
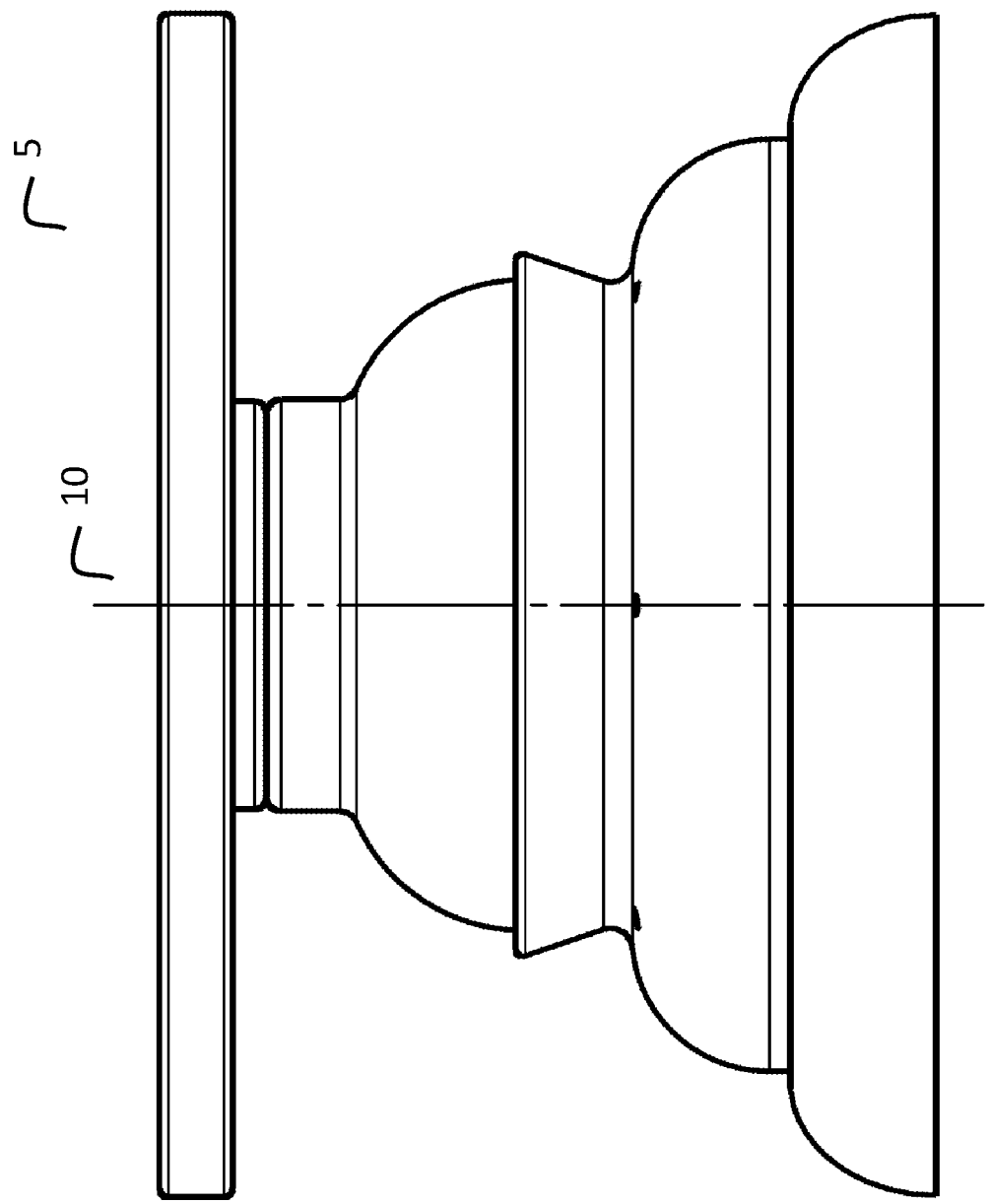
FIG. 8 is a perspective view of an exemplary device with its airbag in an expanded position along a first axis.

Applicant's airbag at a minimum has a contracted position (FIG. 7) and an expanded position (FIG. 8). FIG. 8 illustrates how the magnet holder expands into an expanded position along a first axis 10. It can also have a half-expanded position that is similar to the expanded position along the first axis 10 but does not extend as far. It can also have a pivot position where the device can be used to support a mobile device at a surface at a transverse angle to the mobile device. The pivot position is not fully expanded along the first axis 10. For example, the pivot position can hold a mobile phone in a good position on a countertop for viewing a movie so that the user does not have to hold the mobile device. Additionally or alternatively, if the magnet holder is magnetically mounted on a metal surface, the pivot position can hold the mobile device in a position that is not parallel to the metal surface.

In order to conveniently affix the magnet holder onto the mobile phone, a double-sided adhesive tape (not shown) or a magnet (not shown) can be arranged on the inner base 2 of the present embodiment. 3M™ 300LSE™ is an example adhesive that could be used.

The expandable airbag can be made of soft materials that preferably mold easily. For example, Applicant uses thermoplastic polyurethanes for the expandable air bag. Similar performing materials could be used.

Disclosed throughout this specification are the creation and connections of components that individually or in combination can comprising methods of manufacturing in various forms to put together the inner base, the magnet outer base and the air bag. For example, each fastening means disclosed herein can be construed as a method step of performing the step of fastening.

The hard components can be a variety of materials. Applicant prefers materials that mold easily and are economical and a good tradeoff between strength and weight. For example, polycarbonate or ABS plastics can be used for the inner base and the outer magnet base (excluding the magnet inserts themselves). Similar performing materials could be used.

In order to conveniently affix and mount the magnet insert 13, an attaching layer 15 is arranged on the bottom of the lower shell 11 of the present embodiment, the bottom shell 11 is provided with a through hole 16 along a vertical direction, and the magnet insert 13 is arranged in the through hole, with the bottom attached to the attaching layer 15. By utilizing the through hole to mount the magnet insert 13 and the attaching layer 15 to cover the lower ends of the magnet insert, the magnet insert 13 is further fixed; and the attaching layer 15 may be arranged as a double-sided adhesive tape to further ensure the affixing of the bottom shell 11.

Figure 9:
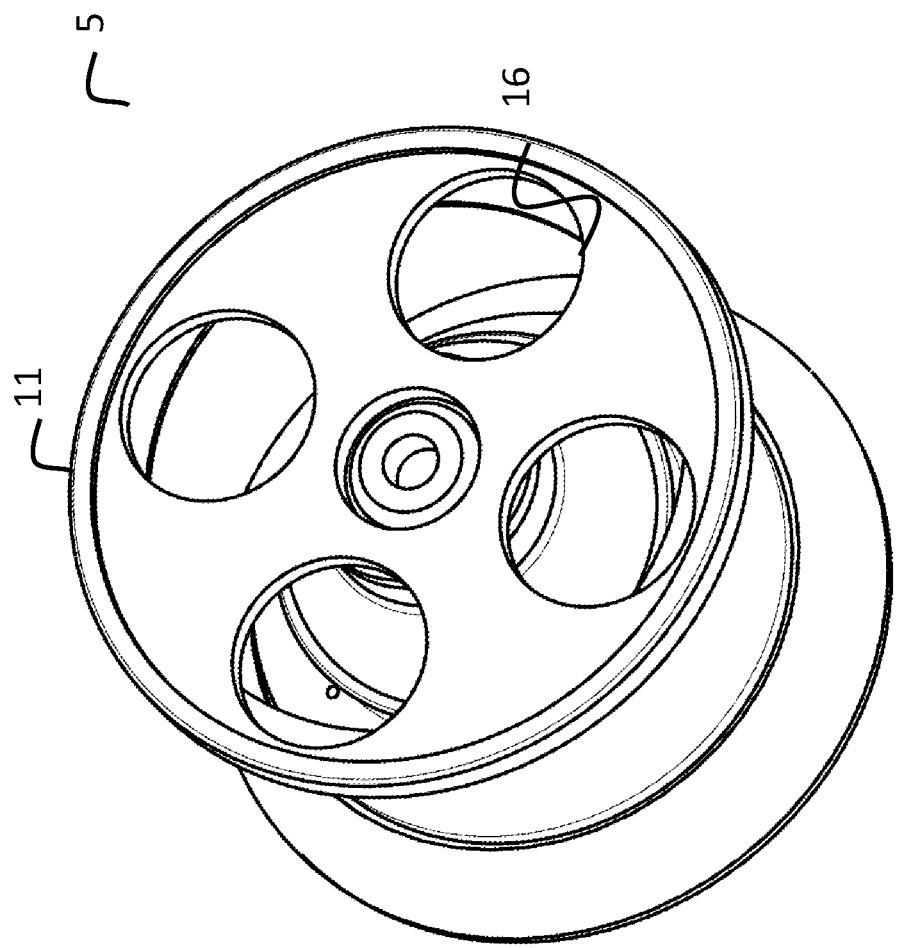
FIG. 9 shows a perspective view of a second exemplary embodiment of the molded part that can hold the magnet inserts attached to the device.
Figure 10:
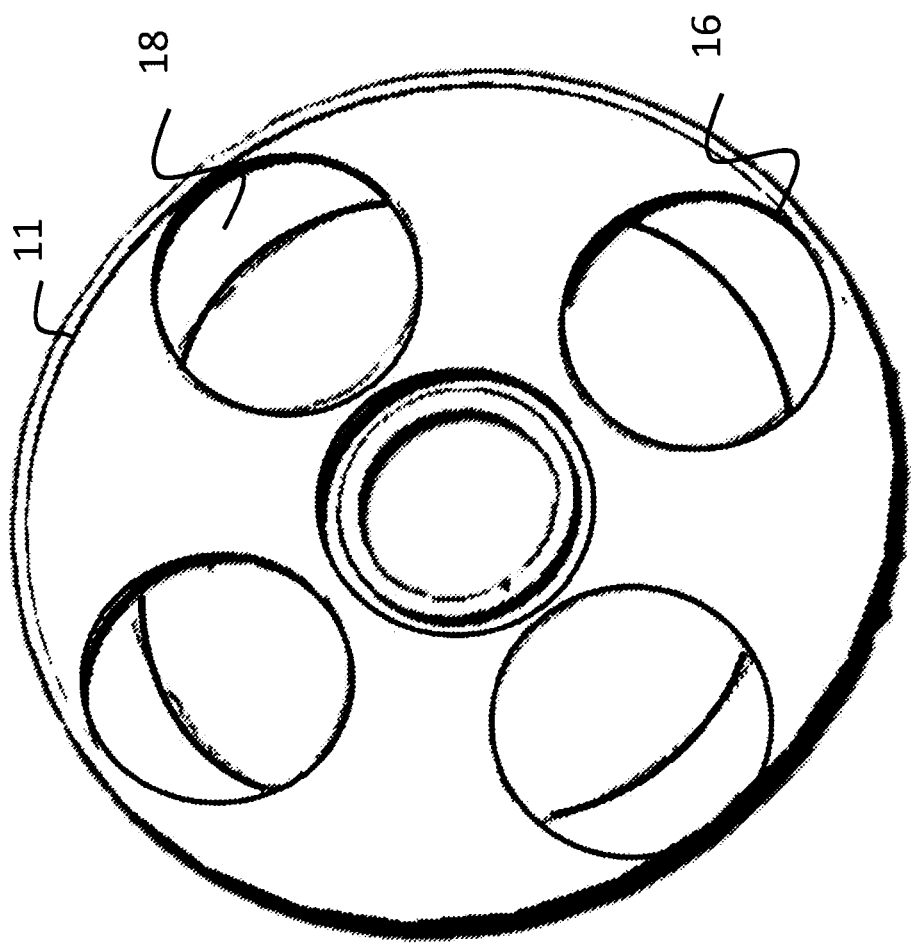
FIG. 10 shows a cross-sectional view of the molded part of FIG. 10, which highlights the circular lip below the magnet holes.
Figure 11:
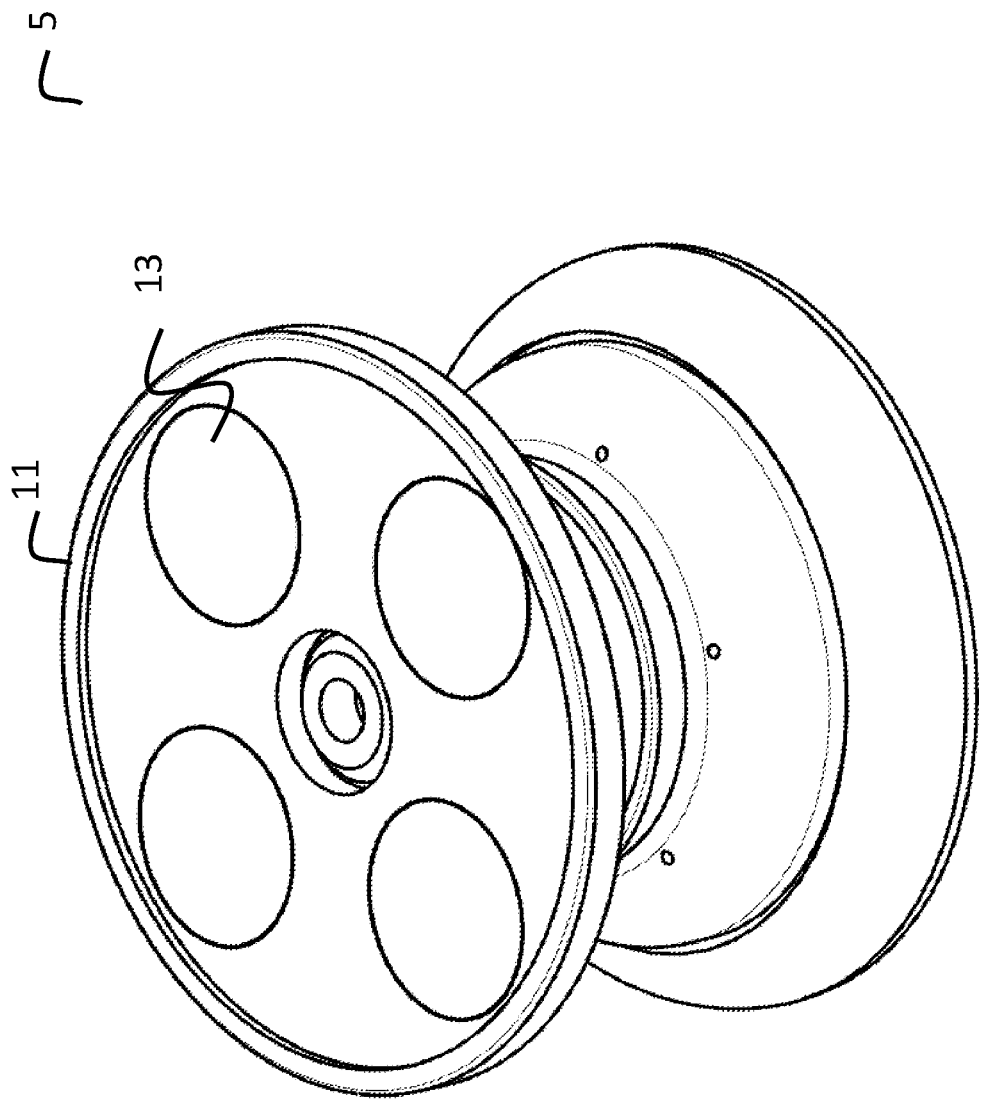
FIG. 11 shows the second exemplary embodiment of the molded part with magnet inserts inserted into the device.
Figure 12:
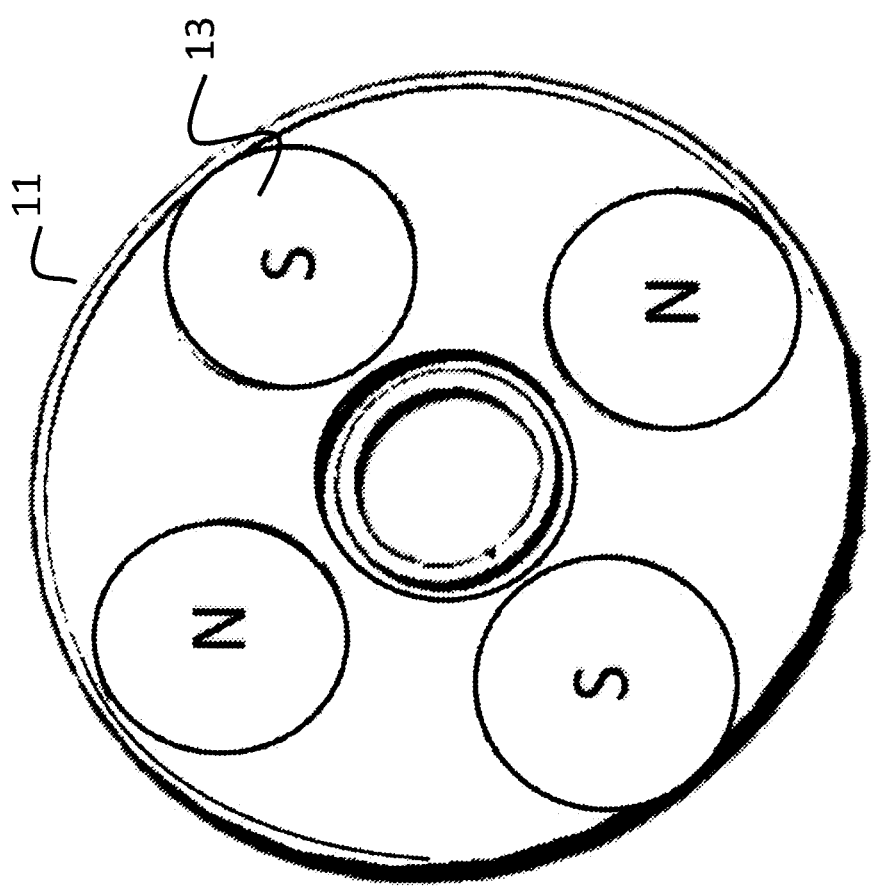
FIG. 12 is an illustration of a cross section of the molded part of FIG. 10 with the magnet inserts inserted into the device and highlighting example polarities of the magnets.

Magnet insert 13 can be a plurality of magnet inserts. For example, four 11 mm diameter N50 neodymium magnet discs can be used as shown in FIG. 11. FIG. 12 illustrates how the plurality of magnet inserts 13 are arranged with alternating polarities in a molded part around the opening connecting with the expandable air bag. This configuration of magnet inserts next to a metal plate helps to build a strong magnet within a slender profile magnet outer base. Other numbers or shapes or sizes or thicknesses or materials of magnet inserts can be used, depending on the applications. In one exemplary embodiment, the metal plate is disposed inside and supported by a circumferential lip 18 extending from the interior of the outer magnet base. Additionally, this lip 18 can support an exterior portion of each of the plurality of magnet inserts that is unsupported by the metal plate. This lip 18 can be molded into the plastic parts, as can the magnet insert receiving areas to create a strong part with immobile interior components and strong magnetic force. The circumferential lip 18 and the magnet insert holes can be molded as part of the lower shell of the magnetic outer base, as shown in the device 5 of FIGS. 9 and 10.

Figure 13:
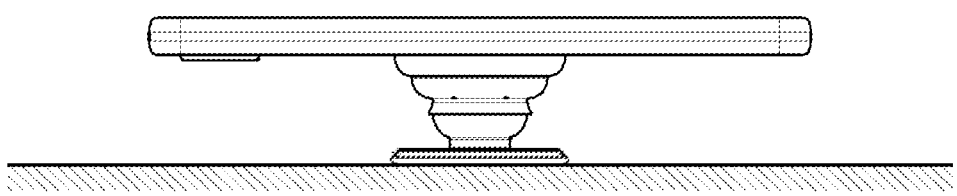
FIG. 13 is a photograph showing an exemplary device attached to a phone that is magnetically attached to a refrigerator front door panel.

FIG. 13 illustrates the magnet holder mounting a phone to a front metal panel of a refrigerator. Instead of a refrigerator, a user can magnetically mount the phone wherever it makes sense, such as a metal toolbox, a metal dishwasher panel, a car panel, a metal chalk board or wherever else the user may be working that day. The convenience of Applicant's magnet holder allows a variety of uses that any related art does not.

Although not shown, internal components can contain glue or other fasteners for the purpose of adhering them together and creating a robust device.

Applicant can also include an additional metal piece containing adhesive or a magnet-mountable car interior mount in a kit. Additionally or alternatively, the kit could contain a phone or a phone case or other phone accessories.

Although the present disclosure has described various embodiments and examples, it will be understood by those skilled in the art that the present disclosure extends beyond the specifically disclosed embodiments to other alternative embodiments and/or uses of the present disclosure and obvious modifications and equivalents thereof. Additionally, the skilled artisan will recognize that any of the above-described methods can be carried out using any appropriate apparatus. Any equivalent structure or equivalent process variation made by utilizing the contents of the description and drawings or direct or indirect application in other related technical fields shall be included within the scope of claims in the same way. For example, the magnet holder could be a flexible tool mount, especially when it is equipped with a magnet on the inner base. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present disclosure should not be limited by the particular disclosed embodiments described above.

What is claimed is:

1. An air bag type magnet holder, comprising:
   an inner base that is attachable to a mobile device;
   an outer magnet base having a magnet configured for magnetically attaching the magnet holder, including a mobile device that can be attached to the inner base, to an external surface containing metal that is distinct from the magnet holder; and
   an expandable air bag including a first end connected to the inner base and a second end connected to the outer magnet base and configured to have at least an expanded position extending the expandable air bag along a first axis providing clearance for a user's fingers between the inner base and the outer magnet base and a contracted position holding the outer magnet base proximate to the inner base,
   wherein the outer magnet base comprises
      an inner shell connected to the second end of the expandable air bag,
      an outer shell on an opposite end of the outer magnet base from the inner shell,
      a metal plate at a transverse angle to the first axis and proximate to the inner shell, and the magnet opposite the metal plate embedded in the lower shell and disposed adjacent to the metal plate.

2. The air bag type magnet holder according to claim 1, wherein,
the expandable air bag is of an inverted conical structure in the expanded position,
a circumferential wall of the second end of the expandable air bag is provided with an annular fastening groove,
the inner shell is provided with a round hole, and
the fastening groove is fastened inside the inner shell through the round hole.

3. The air bag type magnet holder according to claim 1, wherein, the edges of both the inner base and the magnet outer base are shaped like circular arcs and defining a space for a user's finger tips to separate the inner base and the magnet outer base of the expandable air bag in the contracted position.

4. The air bag type magnet holder according to claim 1, wherein
the first end of the expandable air bag is provided with an annular fastening ring,
the inner base comprises a collar hooping the outside of the fastening ring, and
an inner cover nested inside the collar and used for fixing the fastening ring to the collar.

5. The air bag type magnet holder according to claim 4, wherein
an interior wall of the collar is provided with a plurality of L-shaped limit slots,
the interior ends of the limit slots communicate with the interior surface of the collar,
a plurality of fastening projections aligned with the limit slots are formed on an exterior circumferential wall of the top cover,
the fastening ring is provided with a plurality of fastening holes which are aligned with the plurality of fastening projections, and
after passing through the fastening holes, the fastening projections are fixed in the limit slots.

6. The air bag type magnet holder according to claim 1, wherein, the expandable air bag is provided with air holes to release air inside the expandable air bag when the expandable air bag contracts from the expanded position to the contracted position.

7. The air bag type magnet holder according to claim 1, wherein a double-sided adhesive tape or a second magnet is arranged on the inner base on a side of the inner base opposite the first end of the air bag.

8. The air bag type magnet holder according to claim 1, wherein
an attaching layer is arranged on an opposite side of the magnet out base from the air bag, the lower shell is provided with a through hole along a vertical direction, and
the magnet insert is arranged in the through hole, with the lower shell attached to the attaching layer.

9. The air bag type magnet holder according to claim 1, wherein the expandable air bag additionally has a pivot position, and the expandable air bag holds the inner base and the outer magnet base at a position along a different axis than the first axis.

10. The air bag type magnet holder according to claim 1, wherein the magnet is a plurality of magnet inserts.

11. The air bag type magnet holder according to claim 10, wherein the plurality of magnet inserts is disc-shaped and arranged in a plane with alternating polarities radially around the outer magnet base.

12. The air bag type magnet holder according to claim 11, wherein the metal plate is disposed inside and supported by a circumferential lip extending from the interior of the outer magnet base, and the circumferential lip additionally supports an exterior portion of each of the plurality of magnet inserts that is unsupported by the metal plate.

13. The air bag type magnet holder, comprising
a kit, the kit comprising
the airbag type magnetic holder comprising:
an inner base that is attachable to a mobile device;
an outer magnet base having a magnet configured for magnetically attaching the magnet holder, including a mobile device that can be attached to the inner base, to an external surface containing metal that is distinct from the magnet holder; and
an expandable air bag including a first end connected to the inner base and a second end connected to the outer magnet base and configured to have at least an expanded position extending the expandable air bag along a first axis providing clearance for a user's fingers between the inner base and the outer magnet base and a contracted position holding the outer magnet base proximate to the inner base; and
a separate metal disc,
wherein an adhesive is on the inner base, and a second adhesive is on the separate metal disc.

14. A method of using an air bag type magnet holder of claim 1, wherein the method comprises the steps of:
attaching the inner base of the air bag type magnet holder to the mobile device; and
positioning the outer magnet base to the external surface containing metal to cause the air bag type magnet holder to magnetically adhere to the surface.

15. The method of claim 14, wherein the step of adhering uses an adhesive.

16. The method of claim 14, wherein the mobile device is a phone.

17. The method of claim 14, wherein the external surface is part of a refrigerator, toolbox, dishwasher, or motor vehicle.

18. An air bag type magnet holder, comprising:
an inner base that is attachable to a mobile device;
an outer magnet base having a magnet configured for magnetically attaching the magnet holder, including a mobile device that can be attached to the inner base, to an external surface containing metal that is distinct from the magnet holder; and
an expandable air bag including a first end connected to the inner base and a second end connected to the outer magnet base and configured to have at least an expanded position extending the expandable air bag along a first axis providing clearance for a user's fingers between the inner base and the outer magnet base and a contracted position holding the outer magnet base proximate to the inner base,
wherein
the first end of the expandable air bag is provided with an annular fastening ring,
the inner base comprises a collar hooping the outside of the fastening ring,
an inner cover nested inside the collar and used for fixing the fastening ring to the collar,
an interior wall of the collar is provided with a plurality of L-shaped limit slots,
the interior ends of the limit slots communicate with the interior surface of the collar, a plurality of fastening projections aligned with the limit slots are formed on an exterior circumferential wall of the top cover, the fastening ring is provided with a plurality of fastening holes which are aligned with the plurality of fastening projections, and after passing through the fastening holes, the fastening projections are fixed in the limit slots.

19. An air bag type magnet holder, comprising:
an inner base that is attachable to a mobile device;
an outer magnet base having a magnet configured for magnetically attaching the magnet holder, including a mobile device that can be attached to the inner base, to an external surface containing metal that is distinct from the magnet holder; and
  an expandable air bag including a first end connected to the inner base and a second end connected to the outer magnet base and configured to have at least an expanded position extending the expandable air bag along a first axis providing clearance for a user's fingers between the inner base and the outer magnet base and a contracted position holding the outer magnet base proximate to the inner base,
  wherein an attaching layer is arranged on an opposite side of the outer magnet base from the air bag,
  the lower shell is provided with a through hole along a vertical direction, and
  the magnet insert is arranged in the through hole, with the lower shell attached to the attaching layer.

20. An air bag type magnet holder, comprising:
an inner base that is attachable to a mobile device;
an outer magnet base having a magnet configured for magnetically attaching the magnet holder, including a mobile device that can be attached to the inner base, to an external surface containing metal that is distinct from the magnet holder; and
  an expandable air bag including a first end connected to the inner base and a second end connected to the outer magnet base and configured to have at least an expanded position extending the expandable air bag along a first axis providing clearance for a user's fingers between the inner base and the outer magnet base and a contracted position holding the outer magnet base proximate to the inner base;
  wherein
  the magnet is a plurality of magnet inserts,
  the plurality of magnet inserts is disc-shaped and arranged in a plane with alternating polarities radially around the outer magnet base, and
  the metal plate is disposed inside and supported by a circumferential lip extending from the interior of the outer magnet base, and the circumferential lip additionally supports an exterior portion of each of the plurality of magnet inserts that is unsupported by the metal plate.

21. The air bag type magnet holder according to claim 20, wherein,
the expandable air bag is of an inverted conical structure in the expanded position,
a circumferential wall of the second end of the expandable air bag is provided with an annular fastening groove,
the inner shell is provided with a round hole, and
the fastening groove is fastened inside the inner shell through the round hole.

22. The air bag type magnet holder according to claim 20, wherein, the edges of both the inner base and the magnet outer base are shaped like circular arcs and defining a space for a user's finger tips to separate the inner base and the magnet outer base of the expandable air bag in the contracted position.

23. The air bag type magnet holder according to claim 20, wherein
the first end of the expandable air bag is provided with an annular fastening ring,
the inner base comprises a collar hooping the outside of the fastening ring, and
an inner cover nested inside the collar and used for fixing the fastening ring to the collar.

24. The air bag type magnet holder according to claim 20, wherein
an interior wall of the collar is provided with a plurality of L-shaped limit slots,
the interior ends of the limit slots communicate with the interior surface of the collar,
a plurality of fastening projections aligned with the limit slots are formed on an exterior circumferential wall of the top cover,
the fastening ring is provided with a plurality of fastening holes which are aligned with the plurality of fastening projections, and
after passing through the fastening holes, the fastening projections are fixed in the limit slots.

25. The air bag type magnet holder according to claim 20, wherein, the expandable air bag is provided with air holes to release air inside the expandable air bag when the expandable air bag contracts from the expanded position to the contracted position.

26. The air bag type magnet holder according to claim 20, wherein a double-sided adhesive tape or a second magnet is arranged on the inner base on a side of the inner base opposite the first end of the air bag.

27. The air bag type magnet holder according to claim 20, wherein
an attaching layer is arranged on an opposite side of the magnet out base from the air bag, the lower shell is provided with a through hole along a vertical direction, and
the magnet insert is arranged in the through hole, with the lower shell attached to the attaching layer.

28. The air bag type magnet holder according to claim 20, wherein the expandable air bag additionally has a pivot position, and the expandable air bag holds the inner base and the outer magnet base at a position along a different axis than the first axis.

* * * * *